(12) United States Patent
Sun et al.

(10) Patent No.: US 9,197,461 B1
(45) Date of Patent: Nov. 24, 2015

(54) METHOD AND APPARATUS FOR MEMORY EFFICIENT ARCHITECTURE OF SUCCESSIVE INTERFERENCE CANCELLATION FOR MIMO SYSTEMS

(71) Applicant: MARVELL INTERNATIONAL LTD., Hamilton (BM)

(72) Inventors: Yakun Sun, Sunnyvale, CA (US); Leilei Song, Sunnyvale, CA (US); Hui-Ling Lou, Sunnyvale, CA (US); Mingguang Xu, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/207,117

(22) Filed: Mar. 12, 2014

Related U.S. Application Data (60) Provisional application No. 61/777,279, filed on Mar. 12, 2013.

(51) Int. Cl.
| | | |
|---|---|---|
| H04B 7/02 | (2006.01) | |
| H04L 25/03 | (2006.01) | |
| H04B 7/04 | (2006.01) | |
| H04L 1/06 | (2006.01) | |
| H04L 1/00 | (2006.01) | |

(52) U.S. Cl.
CPC ........ H04L 25/03891 (2013.01); H04B 7/0413 (2013.01); H04L 1/0618 (2013.01); H04L 25/03038 (2013.01); *H04L 1/0054* (2013.01); *H04L 25/03057* (2013.01)

(58) Field of Classification Search
None
See application file for complete search history.

(56) References Cited

U.S. PATENT DOCUMENTS

| | | |
|---|---|---|
| 6,584,115 B1 | 6/2003 | Suzuki |
| 8,135,098 B2 | 3/2012 | Lee et al. |
| 8,149,957 B2 | 4/2012 | Oh et al. |
| 8,155,233 B1 | 4/2012 | Lee et al. |
| 8,185,798 B2 | 5/2012 | Oteri et al. |
| 8,243,860 B1 | 8/2012 | Lee et al. |
| 8,335,286 B2 | 12/2012 | Mergen et al. |
| 8,411,806 B1 | 4/2013 | Lee et al. |
| 8,630,379 B1 | 1/2014 | Sun et al. |
| 8,687,751 B1 | 4/2014 | Lee et al. |
| 2002/0150187 A1 | 10/2002 | Chugg et al. |

(Continued)

FOREIGN PATENT DOCUMENTS

WO   WO-2006/056836 A1   6/2006

OTHER PUBLICATIONS

IEEE Std 802.16/2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.*, Oct. 1, 2004; 893 pages.

(Continued)

*Primary Examiner* — Leon-Viet Nguyen (57) ABSTRACT

In a method for performing successive interference cancellation (SIC) in a multiple input, multiple output (MIMO) communication channel, a plurality of received signals are processed to decode a first codeword. An equalizer is generated corresponding to a second codeword and applied to the plurality of received signals to generate an equalized signal. An interference signal is also generated using the first codeword and then subtracted from the equalized signal. The equalized signal is processed to decode the second codeword.

21 Claims, 6 Drawing Sheets

(56) References Cited

U.S. PATENT DOCUMENTS

| | | | |
|---|---|---|---|
| 2005/0025039 | A1 | 2/2005 | Hwang et al. |
| 2005/0053172 | A1 | 3/2005 | Heikkila |
| 2005/0063378 | A1 | 3/2005 | Kadous |
| 2005/0101259 | A1 | 5/2005 | Tong et al. |
| 2005/0201478 | A1 | 9/2005 | Claussen et al. |
| 2005/0286462 | A1 | 12/2005 | Roh et al. |
| 2006/0198460 | A1 | 9/2006 | Airy et al. |
| 2006/0269023 | A1 | 11/2006 | Chimitt et al. |
| 2007/0135125 | A1 | 6/2007 | Kim et al. |
| 2007/0165737 | A1 | 7/2007 | Sarrigeorgidis |
| 2007/0183541 | A1 | 8/2007 | Moorti et al. |
| 2007/0211813 | A1 | 9/2007 | Talwar et al. |
| 2007/0230608 | A1 | 10/2007 | Li |
| 2008/0025442 | A1 | 1/2008 | Hwang et al. |
| 2008/0239938 | A1 | 10/2008 | Jalloul et al. |
| 2008/0297415 | A1 | 12/2008 | Berens et al. |
| 2009/0225889 | A1 | 9/2009 | Tsai et al. |
| 2011/0268019 | A1 | 11/2011 | Tang et al. |
| 2013/0170534 | A1* | 7/2013 | Weisman et al. ............ 375/229 |
| 2014/0078608 | A1* | 3/2014 | Xiao et al. ....................... 360/45 |

OTHER PUBLICATIONS

IEEE Std 802.11 g/D8.2, Apr 2003 (Supplement to ANSI/IEEE Std 802.11, 1999 (Reaff 2003)) "Draft Supplement to Standard [for]Information technology-Telecommunications and information exchange between systems-Local and metropolitan area networks-Specific requirements, Part 11: Wireless LAN Medium Access Control (MAC) and Physical Layer (PHY) specifications: Further Higher Data Rate Extension in the 2.4 GHz Band,"The *Institute of Electrical and Electronics Engineers, Inc.*, Apr. 2003.

S. A. Mujtaba, IEEE P802.11—Wireless LANS, TGn Sync Proposal Technical Specification,•doc.: IEEE 802.11—04/0889r6, May 2005.

IEEE Std 802.16a-2003 (Amendment to IEEE Std 802.16-2001) "IEEE Standard for Local and metropolitan area networks: Part 16: Air Interface for Fixed Broadband Wireless Access Systems-Amendment 2: Medium Access Control Modifications and Additional Physical Layer Specifications for 2-11 GHZ," *The Institute of Electrical and Electronics Engineers, Inc.*, Apr. 1, 2003.

IEEE Std 802,11 a-1999 (Supplement to IEEE Std 802.11-1999) Supplement to IEEE Standard for Information technology—Telecommunications and information exchange between systems Local and metropolitan area networks—Specific requirements—Part 11: Wireless LAN Medium Access Control (MAC) and Physical Layer (PHY) specifications: High-Speed Physical Layer in the 5 GHZ Band. The Institute of Electrical and Electronics Engineers. Inc. (1999).

IEEE Std 802.11 b-1999 (Supplement to ANSI/IEEE Std 802.11 . 1999 Edition) "Supplement to IEEE Standard for Information technology—Telecommunications and information exchange between systems—Local and metropolitan area networks-Specific requirements Part 11 : Wireless LAN Medium Access Control (MAC) and Physical Layer (PHY) specifications: Higher-speed Physical Layer Extension in the 2.4 Ghz Band." *The Institute of Electrical and Electronics En ineers. Inc.* 1999.

Zheng et al.. "Link Performance Abstraction for ML Receivers based on RBIR Metrics", IEEE 802.16 Broadband Wireless Access Workin Group Sep. 10, 2007.

IEEE Std 802.11 b-2001 (Corrigendum to IEEE Std 802.11b-1999) "IEEE Standard for Information technology—Telecommunications and information exchange between systems-Local and metropolitan area networks-Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

"IEEE P802.11nTM/D3.00, Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11nTM IEEE Standard for Information Technology-Telecommunications and information exchange between systems-Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std 802.11ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

\* cited by examiner

METHOD AND APPARATUS FOR MEMORY EFFICIENT ARCHITECTURE OF SUCCESSIVE INTERFERENCE CANCELLATION FOR MIMO SYSTEMS

CROSS-REFERENCES TO RELATED APPLICATIONS

This disclosure claims the benefit of U.S. Provisional Patent Application No. 61/777,279 filed on Mar. 12, 2013, which is hereby incorporated by reference herein in its entirety.

FIELD OF THE DISCLOSURE

The present disclosure relates generally to multiple input multiple output (MIMO) systems and, more particularly, to successive interference cancellation in a MIMO system.

BACKGROUND

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. A new standard, IEEE 802.11ac, promises to provide even greater throughput.

Some wireless communication systems utilize multiple transmit antennas and multiple receive antennas to increase the number of signals which may be propagated in the communication system and/or to compensate for deleterious effects associated with the various propagation paths, and to thereby improve transmission performance. Such a system is commonly referred to as a multiple-input, multiple-output (MIMO) wireless transmission system and is specifically provided for within the IEEE 802.11n Standard. Further, the 802.16 standard, or WiMAX, applies to cell-based systems and supports MIMO techniques. Generally speaking, the use of MIMO technology produces significant increases in spectral efficiency and link reliability of wireless communication systems, and these benefits generally increase as the number of transmit and receive antennas within the MIMO system increases.

A MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. However, instead of using all of the various different transmit and receive antennas to form separate spatial channels on which additional information is sent, better transmission and reception properties can be obtained in a MIMO system by using at least some of the various transmit antennas of the MIMO system to transmit the same signal while phasing (and amplifying) this signal as it is provided to the various transmit antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receive antennas, the MIMO system can obtain better transmission reliability between a particular transmitter and a particular receiver, over that obtained by single transmitter-antenna/receiver-antenna systems.

In some MIMO communication systems, multiple bit streams may be encoded for transmission via the MIMO channel using multiple channel encoders, and a single receiver may receive and decode the multiple encoded bit streams. For example, a single transmitter, such as within a user device or a base station, may include multiple channel encoders, and a single receiver may receive and decode the transmissions from the single transmitter. As another example, a plurality of transmitters, such as distributed among a plurality of user devices, may each include a channel encoder, and a single receiver, such as a base station, may receive and decode the transmissions from the plurality of transmitters.

SUMMARY

In one embodiment, a method for successive interference cancellation comprises, processing a plurality of received signals to decode a first codeword and generating an equalizer corresponding to a second codeword in the plurality of received signals. The method further comprises applying the equalizer to the plurality of received signals to generate an equalized signal. Moreover, the method comprises generating an interference signal using the first codeword, subtracting the interference signal from the equalized signal and processing the equalized signal to decode the second codeword.

In another embodiment, a multiple input, multiple output (MIMO) receiver comprises a first receiver device including a first decoder, the first receiver device configured to process a plurality of received signals to decode a first codeword. The MIMO receiver also comprises a second receiver device including a second decoder. The second receiver device is configured to generate an equalizer corresponding to a second codeword in the plurality of received signals and apply the equalizer to the plurality of received signals to generate an equalizer signal. The second receiver device is further configured to generate an interference signal using the first codeword, subtract the interference signal from the equalized signal and process the equalized signal to decode the second codeword using the second decoder.

DETAILED DESCRIPTION

In embodiments described below, a multiple input multiple output (MIMO) system performs successive interference cancellation (SIC) to improve the performance of MIMO transmission of multiple codewords. Each codeword may be encoded, modulated and mapped to one or more spatial streams. The streams are then mapped to transmit antennas and then transmitted to receivers using a channel estimation matrix H. To improve the performance of the MIMO system, the codeword associated with the strongest channel conditions may be decoded and demodulated first. As discussed, in some examples, effects of this decoded codeword may then be subtracted from a received signal vector to eliminate interference of the decoded codeword on other codewords. This process may then be repeated, where the effects of the decoded codewords are subtracted from the received signal vector at every iteration. Before decoding each codeword, the effects of the channel during transmission may be reversed by applying an equalizer to the codeword. The equalizer may be applied to the received signal vector before buffering the signal and before subtracting the effects of the decoded codewords from the received signal. Applying the equalizer to the received signal vector creates an equalized signal, which is a scalar output that may be stored. As a result, rather than storing, in the buffer, the received signal vector which requires a large amount of storage space, the buffer may store the equalized signal. In this way, MIMO communication systems utilizing various embodiments of the present disclosure are able to efficiently reduce interference while also minimizing storage space without increasing computational complexity.

Figure 1:
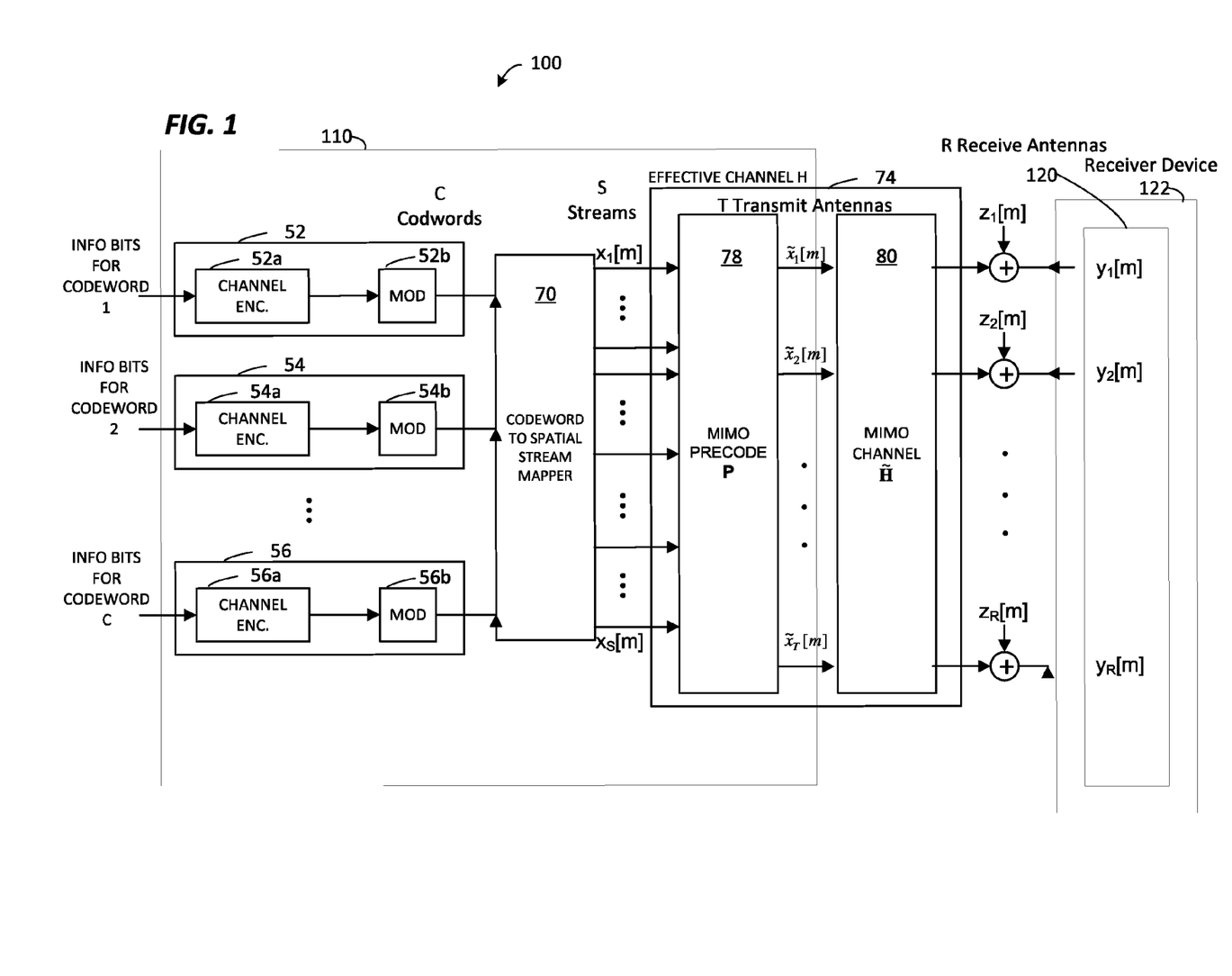
FIG. 1 is a block diagram of an example model of a multiple input multiple output (MIMO) communication system employing several codewords.

FIG. 1 is a block diagram of a model 100 of a MIMO transmission system that includes a transmitter 110, a channel 160 and a receiver device 122. In some embodiments the receiver device 122 may be one or more receiver devices. Moreover, in some embodiments, data to be transmitted may be divided between a large number of transmission systems such as system 100, where each system corresponds to one parallel transmission system. For example, system 100 may correspond to one subcarrier that carries data in a particular frequency range, or a tone. In some embodiments, the illustrated system may represent a wireless communication system. In these embodiments, the transmitter 110 may be a wireless router (or base station) and the receiver device 122 may be a wireless receiver, such as a mobile phone, laptop, handheld device, other wireless router (or base station), or other such device. In some embodiments, the components shown in the transmitter 110 and the receiver device 122 may be implemented by a single integrated circuit (IC) or as separate components in a circuit board or implemented on a programmable logic device. These components may be implemented on separate device or circuits and networked together.

According to FIG. 1, T is the number of transmit (Tx) antennas utilized by the transmitter 110 for communication with the receiver device 122, R is the number of receive (Rx) antennas 120 at the receiver device 122, and S is the number of spatial streams that the transmitter 110 utilizes for transmission to the receiver device 122. The example model 100 includes one or more modulation and coding blocks 52, 54, and 56 at which one or more data streams ("codewords") are encoded and modulated according to a modulation scheme.

Each modulation and coding block 52, 54, and 56 receives a bit stream corresponding to one of C information bit sequences. The modulation and coding blocks 52, 54, and 56 may include encoders 52a, 54a, and 56a that employ error correction or error detection codes to encode the information bit sequences. For example, the encoders may employ a forward error correction encoding process. The modulation and coding blocks 52, 54, and 56 may also include modulators 52b, 54b, and 56b that modulate the encoded information bit sequences to generate modulated symbols. Any suitable modulation technique, including known modulating techniques, may be utilized. For example, QAM, M-QAM, PSK, binary PSK (BPSK), amplitude modulation, frequency shift keying (FSK), etc., may be utilized. In any event, the modulation and coding blocks 52, 54, and 56 output C codewords.

A mapping unit 70 generally maps each output of the C codewords to one or more spatial streams, to generate a total number of S spatial streams, $x_1[m], x_2[m], \ldots, x_S[m]$, where m is a time index. Alternatively, m may represent a frequency index or any transmission opportunity. In particular, mapping unit 70 maps the output of the n-th modulation and coding block to $S_n$ spatial streams, where $$\sum_{n=1}^{C} S_n = S.$$

In other words, the mapping unit 70 maps modulated symbols to spatial streams. The mapping unit 70 may be modeled as matrix multiplication.

The spatial streams are provided to an effective MIMO channel H 74. The effective channel 74 is depicted as including a MIMO precoding block 78 that maps the S spatial streams to T transmit signals $\tilde{x}_1[m], \tilde{x}_2[m], \ldots, \tilde{x}_T[m]$, where T is a number of transmit antennas. The MIMO precoding block 78 may be modeled as a matrix P. The T transmit signals are transmitted, from the transmitter 110 to the receiver device 122 via a MIMO channel $\tilde{H}$ 80.

The received signals at the receiver device 122, $y_1[m], y_2[m], \ldots, y_R[m]$, where R is a number of receive antennas 120, may be modeled as the output of the effective channel 74 with additive noise such as circularly symmetric Gaussian noise:

$$y = Hx + z, \tag{Equation 1}$$

where $$y = \begin{bmatrix} y_1 \\ y_2 \\ \vdots \\ y_R \end{bmatrix} \quad H = \begin{bmatrix} h_{1,1} & h_{1,2} & \ldots & h_{1,S} \\ h_{2,1} & h_{1,2} & \ldots & h_{2,S} \\ \vdots & \vdots & \vdots & \vdots \\ h_{R,1} & h_{R,2} & \ldots & h_{R,S} \end{bmatrix} x = \begin{bmatrix} x_1 \\ x_2 \\ \vdots \\ x_S \end{bmatrix} \quad z = \begin{bmatrix} z_1 \\ z_2 \\ \vdots \\ z_R \end{bmatrix},$$

in which y represents, in vector form, the received signals $y_1[m], y_2[m], \ldots, y_R[m]$, H represents the effective MIMO communication channel 74, x represents the spatial streams $x_1[m], x_2[m], \ldots, x_S[m]$, and z represents the additive noise $z_1[m], z_2[m], \ldots, z_R[m]$ (the time index m has been omitted for notational convenience). In most cases, the model may assume L≤S, S≤T, and S≤R. For super-position coding, however, it may be assumed that L>S.

Equation 1 can be rewritten as:

$$y = Hx + z = \sum_{i=1}^{L} H_i x_i + z,$$ (Equation 2)

where $$H_i = \begin{bmatrix} h_{1,1,i} & h_{1,2,i} & \cdots & h_{1,S_i,i} \\ h_{2,1,i} & h_{1,2,i} & \cdots & h_{2,S_i,i} \\ \vdots & \vdots & \vdots & \vdots \\ h_{R,1,i} & h_{R,2,i} & \cdots & h_{R,S_i,i} \end{bmatrix} x_i = \begin{bmatrix} x_{1,i} \\ x_{2,i} \\ \vdots \\ x_{S_i,i} \end{bmatrix},$$

in which $x_i$ represents the spatial streams corresponding to the i-th codeword $S_i$ is the number of spatial streams corresponding to the i-th codeword, and $H_i$ is a matrix representing the effective MIMO communication channel for the spatial streams corresponding to the i-th codeword.

Received signals $y_1[m]$, $y_2[m]$, ..., $y_R[m]$ may include information from one or more of signals $\tilde{x}_1[m]$, $\tilde{x}_2[m]$, ..., $\tilde{x}_T[m]$ that have been attenuated and/or corrupted by the MIMO channel 80 and noise sources $z_1[m], z_2[m], \ldots, z_R[m]$. The receiver device 122 may process the received signals to produce an output bit sequence corresponding to the bit sequence for one of the codewords. The processing may include decoding and demodulating the received signals. One technique for improving the performance of the MIMO transmission system in FIG. 1 is to use successive interference cancellation (SIC).

Figure 2:
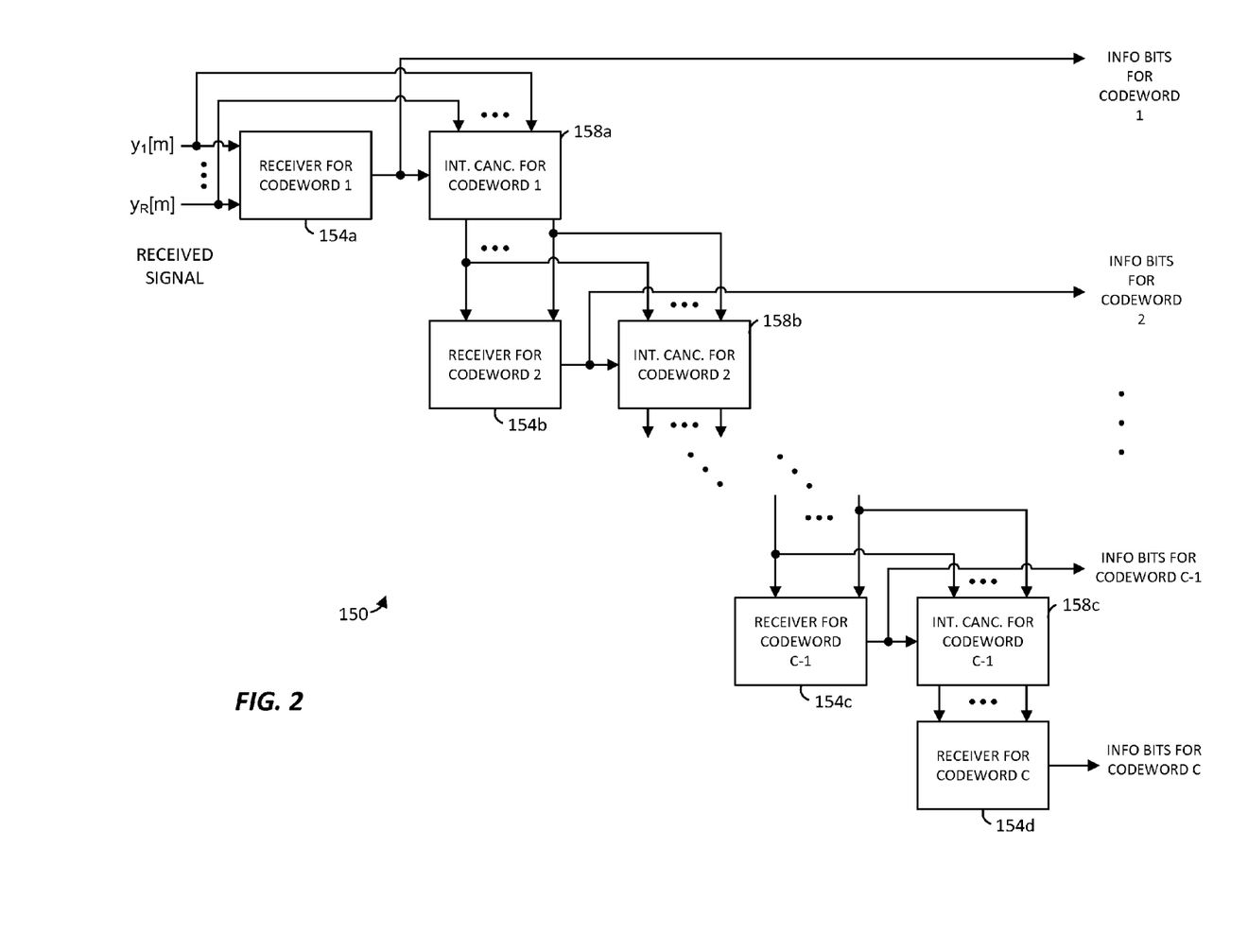
FIG. 2 is a block diagram of a system for performing successive interference cancellation (SIC) according to an embodiment.

FIG. 2 is a block diagram of a system 150 for performing SIC according to some embodiments which may be implemented by the receiver device 122 of FIG. 1. The system 150 includes C decoding stages 154 and C−1 interference cancellers 158 for respectfully decoding codewords $L_1, L_2, \ldots L_C$. For ease of illustration, only 4 of the stages are shown and the stages are chosen to correspond, respectively, to codewords 1, 2, ... C in that order (e.g., $L_1=1, L_2=2, \ldots L_C=C$). However, any desired ordering of codewords may be used, as will be explained in further detail below.

Each stage (except the last stage) may include a receiver block for receiving a codeword i and an interference canceller associated with the codeword i. For example, receiver block 154a and interference canceller 158a may correspond to the first stage associated with codeword 1; receiver block 154b and interference canceller 158b may correspond to the second stage associated with codeword 2; and receiver block 154c and interference canceller 158c may correspond to the C−1th stage associated with codeword C−1. The last stage may include a receiver block associated with codeword C and no interference canceller block, for example, receiver block 154d.

At the first stage, the first receiver block 154a processes the R signals $y_1[m], y_2[m], \ldots, y_R[m]$ to demodulate and decode codeword 1 in order to receive the information bit sequence corresponding to codeword 1. The first interference canceller 158a is coupled to receive and re-encode modulate the decoded output of the receiver block 154a to estimate the components of $y_1[m], y_2[m], \ldots, y_R[m]$ due to codeword 1. The re-encoded, modulated output of the receiver 154a may be represented as reconstructed transmitted signal vector $x_{L1}$. The reconstructed transmitted signal vector is also modified by the effective channel matrix $H_{L1}$ corresponding to codeword 1. The effective channel matrix for the i+1 stage may be obtained by deleting the columns corresponding to the channels for the $L_i$ codeword. Therefore, for codeword 1 which corresponds to $L_1$ in this example, the effective channel matrix is H. Then, the interference canceller 158a subtracts the estimated components due to codeword 1 ($H_{L1} x_{L1}$) from $y_1[m], y_2[m], \ldots, y_R[m]$ to generate an interference-free received signal vector $y_2$. Thus, the interference canceller 158a attempts to subtract out the interference of codeword 1 with respect to codewords 2 through C.

At the second stage, the second receiver block 154b processes the R signals output from the first interference canceller 158a to demodulate and decode codeword 2. The second interference canceller 158b then re-encodes and modulates the output of the receiver 154b to estimate the components of $y_1[m], y_2[m], \ldots, y_R[m]$ due to codeword 2. The re-encoded, modulated output of the receiver 154b may be represented as reconstructed transmitted signal vector $x_{L2}$. The reconstructed transmitted signal vector is also modified by the effective channel matrix $H_{L2}$ corresponding to codeword 2. The effective channel matrix $H_{L2}$ is the result of subtracting columns corresponding to codeword 1 from the effective channel matrix H. Then, the interference canceller 158b subtracts the estimated components due to codeword 2 ($H_{L2} x_{L2}$) from the output of the first interference canceller 158a to generate the interference-free received signal $y_3$. Thus, the interference canceller 158b attempts to subtract out the interference of codeword 2 with respect to codewords 3 through C. The same technique continues until the C-th receiver block 154d processes the R signals output from the (C−1)-th interference canceller 158c to demodulate and decode the C-th codeword. The equation for calculating the received signal for the codeword to decode at the (i+1)-th stage is:

$$y_{i+1} = y_i - H_{Li} x_{Li} = y - \Sigma_{m=1}^{i} H_{Lm} x_{Lm},$$ (Equation 3)

where $$H_{i+1} = H_i \backslash H_{Li}$$ (Equation 4)

where the received signal y and the reconstruction transmitted signal x are vectors and where the expression A\B denotes the deletion of columns of the matrix B from the matrix A.

In some embodiments the receiver blocks and the interference canceller blocks may be implemented on two different receiver devices. Moreover, the system 150 illustrated in FIG. 2 is implemented such that one codeword is decoded serially at each stage. However, in other embodiments all of the codewords may be decoded in parallel. The successfully decoded codewords may be fed back for interference cancellation from the received signal in the same manner as described above.

Alternatively, in yet other embodiments the codewords may be decoded serially with a cyclic redundancy check (CRC) at each stage. For example, as described above, at the first stage the first receiver block 154a processes the R signals $y_1[m], y_2[m], \ldots, y_R[m]$ to demodulate and decode codeword 1. However, in this embodiment the output of the first receiver block 154a is checked using CRC to make sure codeword 1 is successfully decoded. If codeword 1 is successfully decoded, the first interference canceller 158a re-encodes and modulates the output of the first receiver block 154a and the process continues in the same manner as mentioned above. However, if codeword 1 is not successfully decoded interference is not cancelled from the received signal.

To properly receive and decode each codeword, the effects of the communication channel on the received signals, such as the effective MIMO channel H 74 (as shown in FIG. 1), must be reversed. In order to reverse the effects of the communication channel, a MIMO equalizer is employed. The MIMO equalizer may be a linear equalizer such as an MMSE equalizer, a decision feedback equalizer, a blind equalizer, an adaptive equalizer, a matched filter equalizer, a maximal ratio combining (MRC) equalizer, etc.

One way to employ the MIMO equalizer is to store the received signal vector y and the effective channel estimate $H_{Li}$ for each codeword. To calculate the received signal for the (i+1)-th codeword, the received signal vector y and the effective channel estimate $H_{Li}$ are loaded off the buffer, and the reconstructed transmitted signal vector from the i-th codeword is multiplied by the effective channel estimate. The result is then subtracted from the received signal vector y. After performing interference cancellation for the (i+1)-th stage using Equation 3, $y_{i+1} = y_i - H_{Li} x_{Li}$, the output is equalized using the MIMO equalizer before it is decoded. However, this method requires a large amount of memory storage because the received signal vector and channel estimate for each codeword are stored in a buffer.

Figure 3:
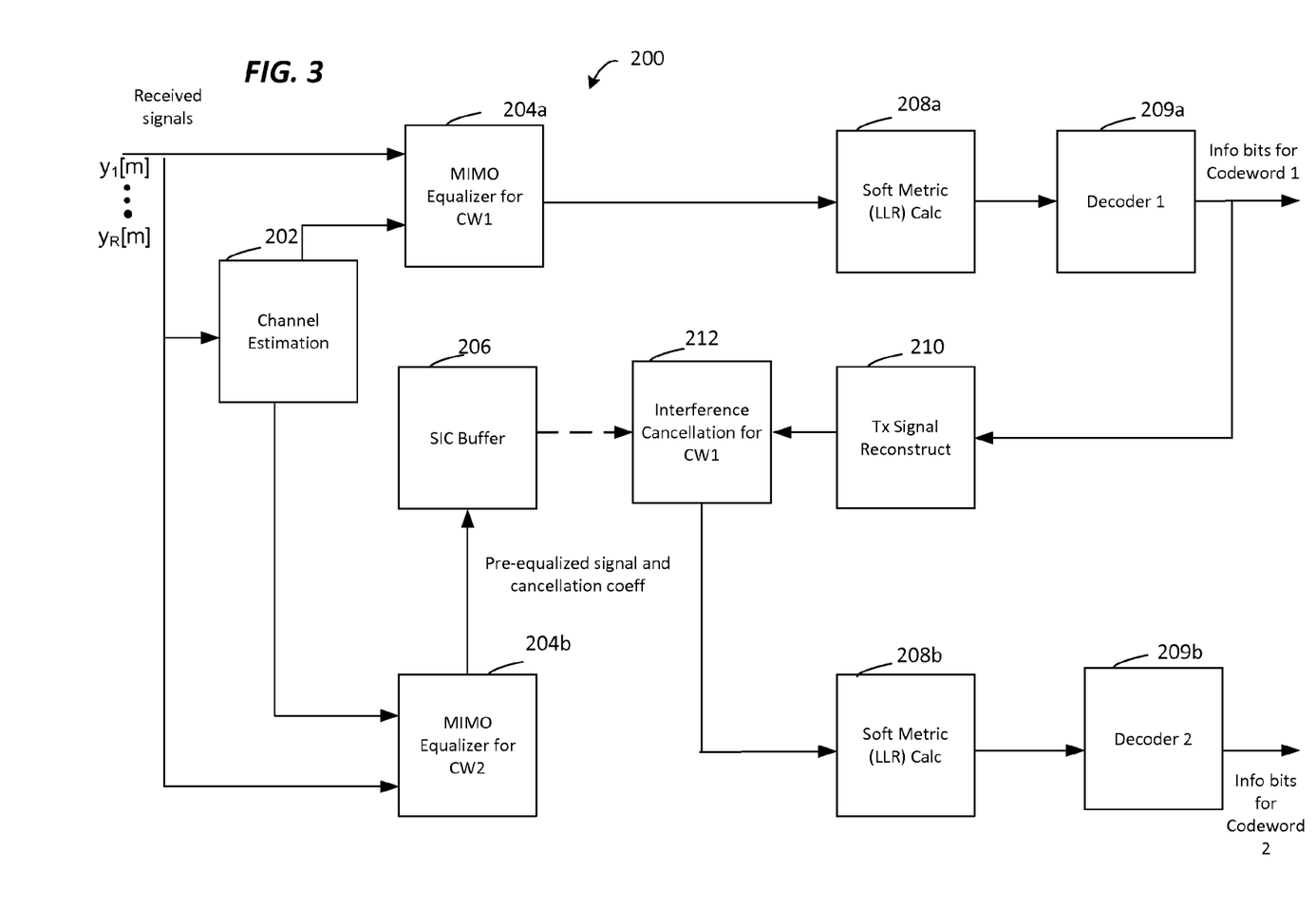
FIG. 3 is a block diagram of an example architecture for implementing SIC in a MIMO system while minimizing memory storage and computational complexity.

FIG. 3 is a block diagram of an example architecture 200 for implementing SIC in a MIMO system while minimizing memory storage without increasing computational complexity. The example architecture 200 described in FIG. 3 may be implemented, for example, on the receiver device 122 of FIG. 1. Moreover, the system 150 described in FIG. 2 may be applied using the example architecture 200.

In the example architecture 200, for each stage, a MIMO Equalizer is generated at a MIMO Equalizer block 204b. The received signal vector y as well the channel estimate, H, received from a channel estimation block 202, are then fed into the MIMO Equalizer block 204b for codeword 2. The MIMO Equalizer block 204b applies the MIMO Equalizer to the channel estimate for the channel corresponding to the previous codewords, $H_{L1} \ldots H_{Li-1}$, to generate cross-correlation coefficients. The MIMO Equalizer block 204b also separately applies the MIMO Equalizer to the received signal vector, y, to generate an equalized signal. The cross-correlation coefficients and the equalized signal are then fed into the SIC buffer block 206, which may be a computer-readable memory. The MIMO Equalizer for codeword i can be represented as $c^{(i)}$. In some embodiments, a linear MIMO Equalizer $c^{(i)}$ may be calculated as:

$$c^{(i)} = H_{Li}^H (H_i H_i^H + \sigma^2 I)^{-1}, \quad \text{(Equation 5)}$$

where H is the channel estimate.

In this manner, instead of buffering the received signal vector y and the channel estimate $H_{Li-1}$, the equalized signal is loaded onto the SIC buffer 206. The equalized signal is a combination of the MIMO Equalizer for the codeword, $c^{(i)}$ and the received signal, y, resulting in the equalized signal $c^{(i)}y$. Consequently, the equalized signal, $c^{(i)}y$, is a scalar output as opposed to the received signal y which is a vector. Moreover, the combination of the MIMO Equalizer for the codeword, $c^{(i)}$, and the channel estimates, $H_{L1} \ldots H_{Li-1}$, result in cross-correlation coefficients, $c^{(i)}H_{L1} \ldots c^{(i)}H_{Li-1}$, which are also loaded onto the SIC buffer 206.

After feeding the received signal y through the MIMO Equalizer block 204a for codeword 1, the resulting output is processed which may include demodulating and decoding the signal at a soft bit metric calculator block 208a and a decoder 1 block 209a, respectively. Each of these blocks may correspond to the modulation and coding blocks 52, 54, and 56 at the transmitter 110 of FIG. 1. The soft bit metric calculator block 208a and the decoder 1 block 209a effectively undo the operation performed by the corresponding transmitter component. For example, the soft bit metric calculator block 208a may correspond to the modulator 52b, and can demodulate the received signal according to the same modulation scheme as that used by the modulator 52b. The decoder 1 block 209a may correspond to the channel encoder 52a, and may perform decoding based on the same error correcting code (e.g., convolutional code) as encoder 52a. Thus, the decoder 1 block 209a may produce an estimate of the information bits for codeword 1.

The estimate of the information bits for codeword 1 are then re-encoded and modulated to reconstruct the transmitted signal vector $x_{L1}$ at block 210. For example, the information bits for codeword 1 may be re-encoded using a receiver-side rendition of the channel encoder 52a and modulated using receiver-side rendition of the modulator 52b of FIG. 1. The reconstructed transmitted signal vector $x_{L1}$ is then fed to the interference cancellation block 212 for codeword 1. The interference cancellation block 212 retrieves the equalized signal, $c^{(2)}y$, and the cross-correlation coefficient, $c^{(2)}H_{L1}$, from the SIC buffer 206 and applies the cross-correlation coefficient, $c^{(2)}H_{L1}$ to the reconstructed transmitted signal vector to generate an interference signal, $c^{(2)}H_{L1} x_{L1}$. The interference signal, $c^{(2)}H_{L1} x_{L1}$, is then subtracted from the equalized signal, $c^{(2)}y$, to subtract out the interference from codeword 1 with respect to codewords 2 through C. The output of the interference cancellation block 212 is processed at the soft metric calculator block 208b and decoder 2 block 209b to produce an output bit sequence corresponding to the bit sequence for codeword 2. This technique continues in a similar manner as in the system 150 of FIG. 2 with the use of additional SIC buffers, MIMO Equalizers, interference cancellation blocks, transmitted signal reconstructors, soft metric calculators and decoders. The output of the interference cancellation block 212 for the i-th codeword can be represented by the equation:

$$c^{(i)} y^{(i)} = c^{(i)} y - \sum_{m=1}^{i-1} c^{(i)} H_{L_m} x_{L_m} \quad \text{(Equation 6)}$$

The equation is the same as Equation 3 described above, but with the addition of the MIMO Equalizer, $c^{(i)}$.

By feeding the received signal vector y and the channel estimate $H_{Li-1}$ to the MIMO Equalizer block (e.g., block 204b) before buffering, the architecture 200 saves memory by buffering the scalar equalized signal and the cross-correlation coefficients instead of the received signal vector and the channel estimate.

Figure 4:
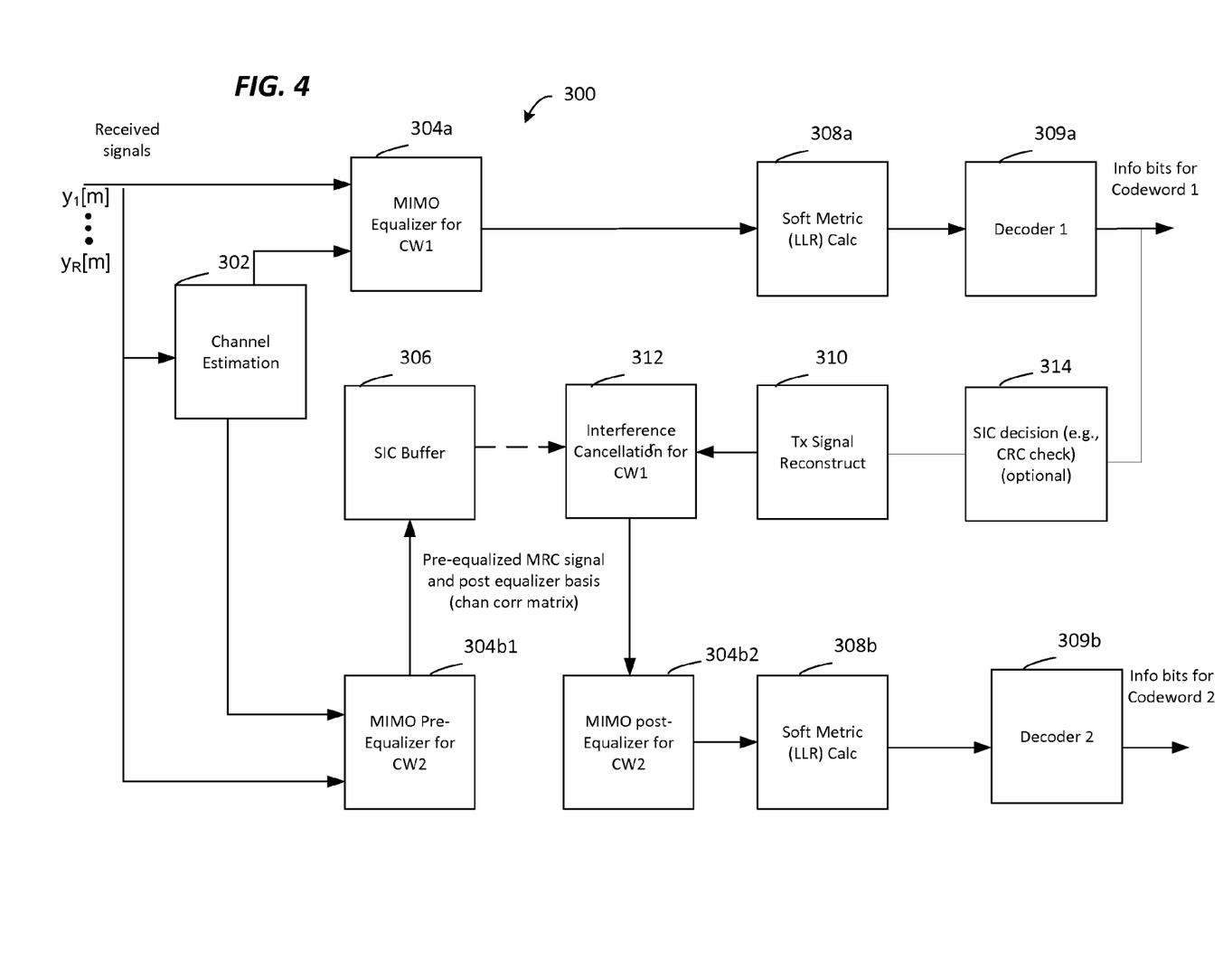
FIG. 4 is a block diagram of an example architecture for implementing SIC with cyclic redundancy checks (CRC) in a MIMO system while minimizing memory storage and computational complexity.

FIG. 4 is a block diagram of an example architecture 300 for implementing SIC with CRC in a MIMO system while minimizing memory storage without increasing computational complexity. The example architecture 300 may be implemented, for example, on the receiver device 122 of FIG. 1. Moreover, the system 150 described in FIG. 2 may be applied using the example architecture 300.

The example architecture 300 contains similar blocks to the architecture 200 of FIG. 3 and like reference numerals are used (e.g., the reference numeral for the decoder 1 block is 209a in FIG. 3 and 309a in FIG. 4). However, the architecture 300 includes a block 314 for performing a CRC check on a decoded codeword. The CRC check is similar to the CRC check described above, and is performed to make sure a codeword is decoded correctly before it is subtracted from the received signal vector y for interference cancellation. If the codeword is not correctly decoded, it is not subtracted from the received signal.

The architecture 300 also splits the MIMO Equalizer block 204b of FIG. 3, into a Pre-Equalizer block 304b1 and a Post-Equalizer block 304b2. The Pre-Equalizer block 304b1 is similar to the MIMO Equalizer block 204b of FIG. 3, but is a "pre-equalizer" because it only contains a portion of the MIMO Equalizer. The Pre-Equalizer block 304b1 and Post-Equalizer block 304b2 combine to form the MIMO Equalizer block 204b. While the MIMO Equalizer, generated by the MIMO Equalizer block 204b of FIG. 3, is calculated using Equation 5, a pre-equalizer, generated by the Pre-Equalizer block 304b1, is calculated using only a portion Equation 5. In some embodiments, the pre-equalizer may be the Hermitian of the channel estimate matrix, $H_{Li}^H$, and compared with $c^{(i)}$, the operand $(H_i H_i^H + \sigma^2 I)^{-1}$ is omitted. The received signal vector y is combined with the pre-equalizer, $H^H$, to form the scalar equalized signal $x^{(out)} = H_{Li}^H y$, which may be stored in the buffer, much like the equalized signal in FIG. 3. Moreover, a post-equalizer basis such as a cross-correlation matrix is also computed at the Pre-Equalizer block 304b1. The post-equalizer basis R may be the result of the Hermitian of the channel estimate applied to the channel estimate, $R_{sub1} = H_i^H H_i$ and $R_{sub2} = H_i^H [H \backslash H_i]$, where A\B means removing a matrix B from a matrix A. Alternatively, the full cross-correlation matrix $R = H^H H$ is computed and the upper-triangle of this resulting matrix, R may be stored in the buffer. Once again, the cross-correlation matrix, R, in the architecture 300 contains a portion of the cross-correlation matrix, $c^{(i)} H$, in the architecture 200 and once again the operand $(H_i H_i^H + \sigma^2 I)^{-1}$ is omitted from the equation. However, the Post-Equalizer block 304b1 generates a post-equalizer which is the omitted operand from the Pre-Equalizer and the cross correlation coefficient with respect to the architecture 200 using the corresponding rows and columns in the full cross-correlation matrix R. For the omitted operand from the pre-equalizer, the cross-correlation submatrix with rows and columns corresponding to all codewords except the successfully decoded codewords is used for $(R_{sub1} + \sigma^2 I)^{-1}$. The post-equalizer then takes the rows of $(R_{sub1} + \sigma^2 I)^{-1}$ corresponding to the codeword of interest $L_i$. For the cross correlation coefficient, the submatrix with rows corresponding to all successfully decoded codewords and the column corresponding to the current codeword of interest $L_i$ is used as $R_{sub2}$. The Post-Equalizer block 304b1 applies the post-equalizer after subtracting the interference signal from the equalized signal in the interference cancellation block 312. The post-equalizer in some examples, need not be stored in the buffer. Instead, only the equalized signal, $x^{(out)}$ and the (upper-triangle) cross-correlation matrix, R, are stored in the buffer. In this manner, the architecture 300 requires even less storage than the architecture 200.

For each codeword (i.e., the i-th codeword), if the previous codeword (i.e., the (i−1)-th codeword), is successfully decoded, then the previous codeword is re-encoded and modulated to reconstruct the transmitted signal, $x_{Li}$. The reconstructed transmitted signal is combined with the correlation matrix to generate an interference signal, $R x_{Li}$, and subtracted from the equalized signal $x^{(out)}$. On the other hand, if the (i−1)-th codeword is not successfully decoded, the interference signal is not subtracted from the equalized signal $x^{(out)}$. Regardless of whether the interference signal is subtracted, the post-equalizer, rows corresponding to $L_i$ in $(R_{sub1} + \sigma^2 I)^{-1}$ is applied, and this process is repeated until each codeword is successfully decoded.

In other embodiments, all of the codewords may be decoded in parallel instead of decoding the codewords one at a time as described with reference to FIGS. 3 and 4. The architecture for decoding codewords in parallel is similar to the architecture 300, and similarly includes a pre-equalizer, a post-equalizer basis and a post-equalizer. When the codewords are decoded in parallel, the system attempts to decode every codeword at the same time. The successfully decoded codewords are then re-encoded and modulated to reconstruct the transmitted signals, much like in the architecture 300. The post-equalizer basis is applied to the reconstructed signals for the successfully decoded codewords and the resulting interference signals are then subtracted from the equalized signal. The post-equalizer is then applied to this result and the system attempts to decode every undecoded codeword at the same time again. This process is repeated until each codeword is successfully decoded.

Figure 5:
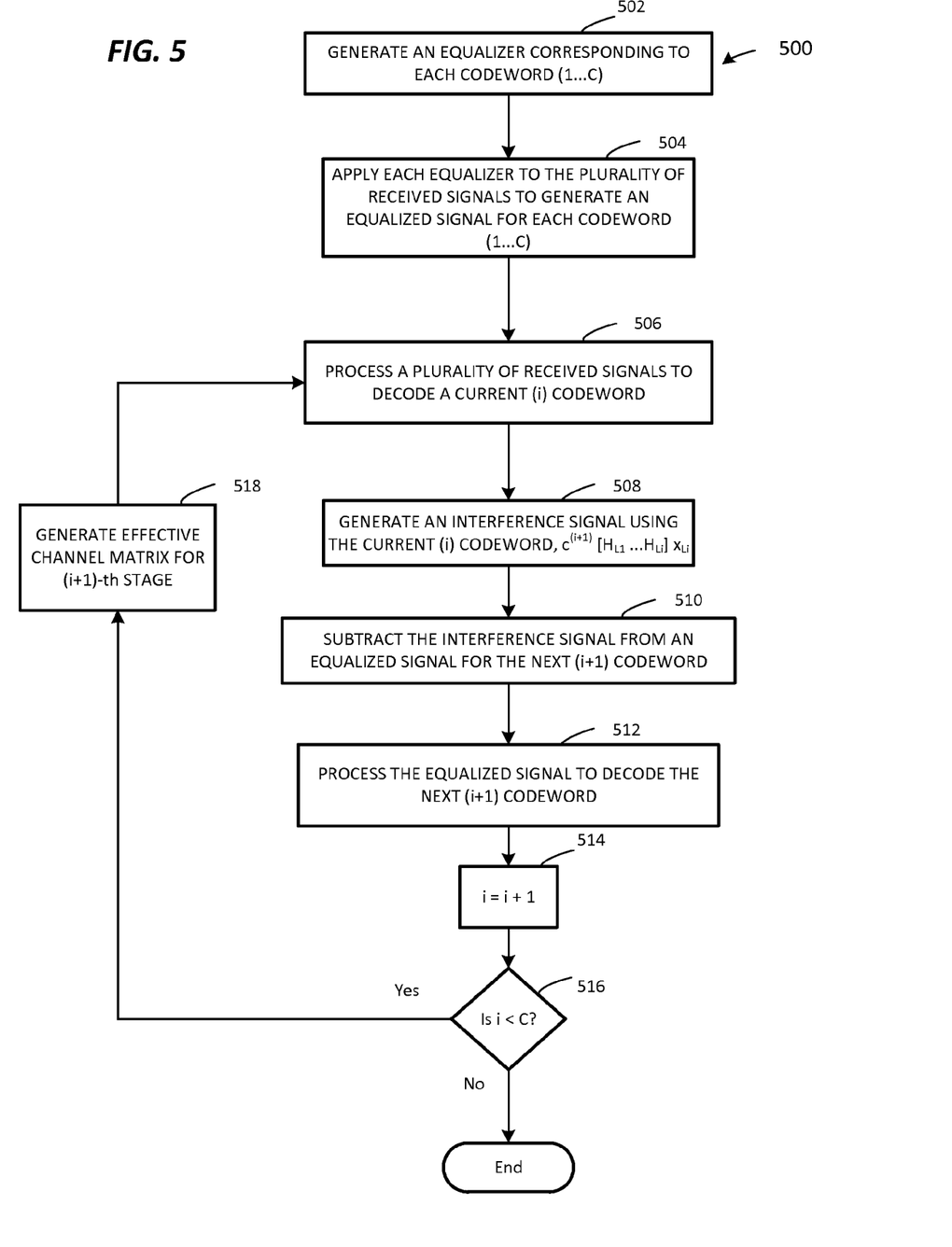
FIG. 5 is a flow diagram of an example method for performing SIC in a MIMO system by applying an equalizer before cancelling interference.

FIG. 5 is a flow diagram of an example process 500 for performing SIC in a MIMO system by applying an equalizer before cancelling interference. At block 502, equalizers are generated corresponding to each codeword for codewords 1 ... C. The equalizers may be linear equalizers such as an MMSE equalizer or any other type of equalizer. Moreover, the equalizers may be a function of the channel estimate H, such as the function in Equation 5. The equalizer for each codeword may be represented as $c^{(i)}$, where i represents the codeword.

At block 504, each equalizer, $c^{(i)}$, is applied to the plurality of received signals y to generate an equalized signal for each codeword, $c^{(i)} y$, which may be a scalar output. Each equalizer is also applied to the effective channel matrix, $H_{L1} \ldots H_{Li}$ to generate the cross-correlation coefficients, $c^{(i)} H_{L1} \ldots c^{(i)} H_{Li}$. Both the equalized signals, $c^{(i)} y$, and the cross-correlation coefficients, $c^{(i)} H_{L1} \ldots c^{(i)} H_{Li}$, are stored in an SIC buffer.

At block 506, a plurality of received signals are processed to decode a current codeword which may be represented as codeword i. The plurality of received signals may form the received signal vector y. In some embodiments, the plurality of received signals are processed by a first receiver device such as the receiver device 122 of FIG. 1.

At block 508, an interference signal is generated. The interference signal is generated by re-encoding and modulating the current codeword, codeword i, decoded at block 506. The reconstructed transmitted current codeword may be represented as $x_{Li}$. The cross-correlation coefficients for the next codeword, codeword i+1, $c^{(i+1)} [H_{L1} \ldots H_{Li}]$, are then loaded from the SIC buffer and applied to the reconstructed transmitted current codeword to generate the interference signal as the sum of $c^{(i+1)} H_{L1} x_{Li} \ldots c^{(i+1)} H_{Li} x_{Li}$. In a first iteration, the cross-correlation coefficients may include first coefficients corresponding to the channel estimate matrix, H. At each subsequent iteration, the cross-correlation coefficients may include second coefficients which are computed from the first coefficients by deleting the columns from the channel estimate matrix H corresponding to the channels for the previous codeword as described above. In some embodiments, the generating the interference signal as well as the rest of the steps of the process 500, may be performed by a second receiver device, such as a receiver device similar to the receiver device 122 of FIG. 1.

Then at block 510, an equalized signal for the next codeword, codeword i+1, is loaded from the SIC buffer and the interference signal is subtracted from the equalized signal. The resulting output is then processed to decode the next codeword (block 512).

At block 514, i is incremented by 1 and it is determined whether all C codewords have been decoded (block 516). If all codewords have been decoded (i.e., i=C), the process 500 may be terminated. Otherwise, if there is any codeword still undecoded (i.e., i<C), the process continues at block 518.

At block 518, the effective channel for the (i+1)-th stage, $H_{i+1}$, may be generated. For example, $H_{i+1}$ may be generated by deleting the columns corresponding to the channels for the $L_i^{th}$ codeword as described above. Then the process 500 repeats starting at block 506 for the next codeword $L_{i+1}$, and at block 508 the interference signal is generated by combining the reconstructed transmitted codeword with one or more second coefficients corresponding to the effective channel for the (i+1)-th stage, $H_{i+1}$.

Figure 6:
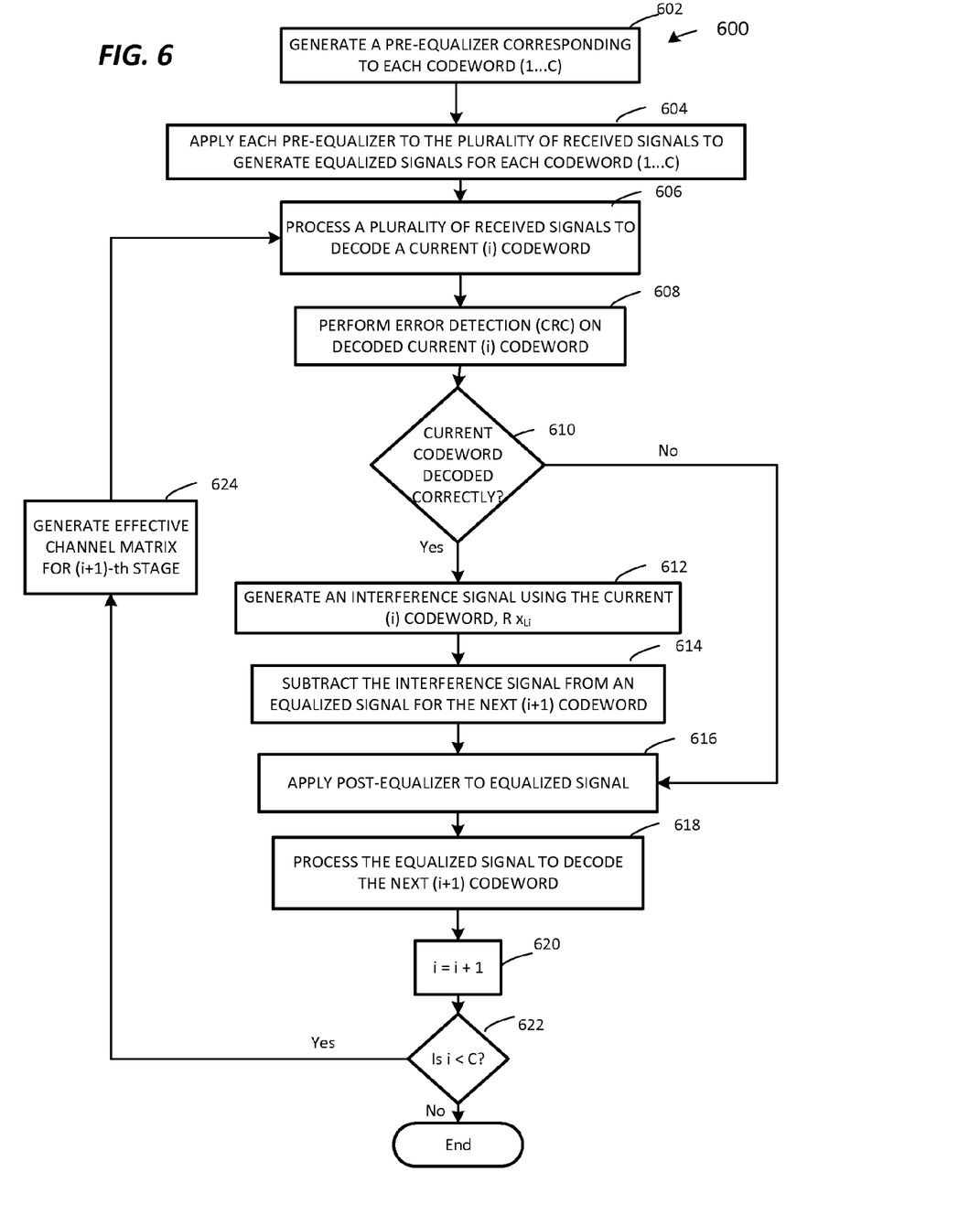
FIG. 6 is a flow diagram of an example method for performing SIC with CRC in a MIMO system by applying an equalizer before cancelling interference.

FIG. 6 is a flow diagram of an example process 600 for performing SIC with CRC in a MIMO system by applying an equalizer before cancelling interference. At block 602, pre-equalizers are generated corresponding to each codeword for codewords 1 ... C1. Each pre-equalizer may be the Hermitian of the channel estimate matrix and may be represented as $H_{Li}^H$.

At block 604, each pre-equalizer, $H_{Li}^H$, is applied to the plurality of received signals to generate an equalized signal for each codeword, $x^{(out)} = H_{Li}^H y$, which may be a scalar output. The effective channel matrix, $H_i$ is used to generate a $R_{sub1} = H_i^H H$ and $R_{sub2} = H_i^H [H\backslash H_i]$ for each codeword. The expression A\B means removing the matrix B from the matrix A. Alternatively, the concerned rows and columns of the post-equalizer basis R are used to construct the $R_{sub1}$ and $R_{sub2}$. Both the equalized signals, $x^{(out)}$, and the post-equalizer basis, R, are stored in an SIC buffer.

At block 606, a plurality of received signals are processed to decode a current codeword which may be represented as codeword i. The plurality of received signals may form the received signal vector y. In some embodiments, the plurality of received signals are processed by a first receiver device such as the receiver device 122 of FIG. 1.

At block 608, error detection is performed on the decoded current codeword, codeword i. For example, a CRC check may be performed on the decoded current codeword to determine whether the current codeword was correctly decoded at block 602. In some embodiments, the error detection as well as the rest of the steps of the process 600, may be performed by a second receiver device, such as a receiver device similar to the receiver device 122 of FIG. 1, or a sublock in the receiver device 122.

If the current codeword, codeword i, was correctly decoded, the process 600 proceeds at block 612 to cancel the interference from the current codeword. Otherwise, interference is not cancelled from the current codeword and the process proceeds at block 616.

At block 612, an interference signal is generated. The interference signal is generated by re-encoding and modulating the current codeword decoded at block 606. The reconstructed transmitted current codeword may be represented as $x_{Li}$. The post-equalizer basis, R, for the next codeword, codeword i+1, is then loaded from the SIC buffer and applied to the reconstructed transmitted current codeword to generate the interference signal, $R [x_{Lm} \ldots x_{Li}]^T$, where codewords $L_m$ through $L_i$ are successfully decoded codewords in previous iterations. In a first iteration, the post-equalizer basis may include first coefficients corresponding to the channel estimate matrix, H. At each subsequent iteration, the post-equalizer basis may include second coefficients which are computed from the first coefficients by deleting the columns from the channel estimate matrix H corresponding to the channels for the previous codeword as described above. Then at block 614, an equalized signal for the next codeword, codeword, i+1, is loaded from the SIC buffer and the interference signal is subtracted from the equalized signal.

At block 616, a post-equalizer, which is a function of the post-equalizer basis R, is applied to the equalized signal for codeword i+1. The post-equalizer may be generated at the Post-Equalizer block 304b2 of FIG. 4. The Post-Equalizer block 304b2 may load the post-equalizer basis R from the buffer and manipulate it to from the post-equalizer. The resulting output is then processed to decode the next codeword, codeword i+1 (block 618).

At block 620, i is incremented by 1 and it is determined whether all C codewords have been decoded (block 622). If all codewords have been decoded (i.e., i=C), the process 600 may be terminated. Otherwise, if there is any codeword still undecoded (i.e., i<C), the process continues at block 624.

At block 624, the effective channel for the (i+1)-th stage, $H_{i+1}$, may be generated. For example, $H_{i+1}$ may be generated by deleting the columns corresponding to the channels for the $L_i^{th}$ codeword as described above. Then the process 600 repeats starting at block 606 for the next codeword $L_{i+i}$ and at block 612 the interference signal is generated by combining the reconstructed transmitted codeword with one or more second coefficients corresponding to the effective channel for the (i+1)-th stage, $H_{i+1}$.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A successive interference cancellation method, comprising:
   generating a first multiple input, multiple output (MIMO) equalizer corresponding to a first codeword in a plurality of received signals;
   applying the first MIMO equalizer to the plurality of received signals to generate a first equalized signal;
   processing the first equalized signal to decode the first codeword;
   generating a second MIMO equalizer corresponding to a second codeword in the plurality of received signals, wherein the second MIMO equalizer is different from the first MIMO equalizer;
   applying the second MIMO equalizer to the plurality of received signals to generate a second equalized signal;
   generating an interference signal using the first codeword;
   subtracting the interference signal from the second equalized signal; and
   processing the second equalized signal to decode the second codeword.

2. A successive interference cancellation method, comprising:
   processing a plurality of received signals to decode a first codeword;
   generating an equalizer corresponding to a second codeword in the plurality of received signals, wherein the equalizer is a pre-equalizer;
   applying the equalizer to the plurality of received signals to generate an equalized signal;
   generating an interference signal using the first codeword;
   subtracting the interference signal from the equalized signal;
   processing the equalized signal to decode the second codeword;
   generating a post-equalizer corresponding to the second codeword in the plurality of received signals; and
   applying the post-equalizer to the equalized signal after subtracting the interference signal from the equalized signal.

3. The method of claim 1, further comprising:
   performing an error detection operation on the first codeword after decoding the first codeword; and
   determining whether the first codeword was decoded correctly based on the performed error detection operation,
   wherein subtracting the interference signal from the second equalized signal is performed only when it is determined that the first codeword was decoded correctly.

4. The method of claim 1, wherein generating the first MIMO equalizer comprises generating a minimum mean square error (MMSE) equalizer.

5. The method of claim 1, wherein generating the second MIMO equalizer comprises generating at least one of a matched filter equalizer or a maximal ratio combining (MRC) equalizer.

6. The method of claim 1, further comprising storing the second equalized signal in a memory at least until the interference signal has been calculated,
   wherein subtracting the interference signal from the second equalized signal comprises retrieving the second equalized signal from the memory.

7. The method of claim 1, further comprising storing one or more first coefficients associated with the interference signal in a memory at least until the interference signal has been calculated,
   wherein subtracting the interference signal from the second equalized signal comprises:
   retrieving the one or more first coefficients from the memory, and
   at least one of
      i) subtracting a combination of the retrieved one or more first coefficients and the interference signal from the second equalized signal, or
      ii) computing one or more second coefficients from the retrieved one or more first coefficients, and subtracting a combination of the one or more second coefficients and the interference signal from the second equalized signal.

8. A successive interference cancellation method, comprising:
   processing a plurality of received signals to decode a first codeword;
   generating a first equalizer corresponding to a second codeword in the plurality of received signals;
   applying the first equalizer to the plurality of received signals to generate a first equalized signal;
   generating a first interference signal using the first codeword;
   subtracting the first interference signal from the first equalized signal;
   processing the first equalized signal to decode the second codeword;
   generating a second interference signal using the second codeword;
   generating a second equalizer corresponding to a third codeword in the plurality of received signals;
   applying the second equalizer to the plurality of received signals to generate a second equalized signal;
   subtracting the first interference signal and the second interference signal from the second equalized signal; and
   processing the second equalized signal to decode the third codeword.

9. The method according to claim 8, wherein:
   the second equalizer is a pre-equalizer; and
   the method further comprises:
      generating a post-equalizer corresponding to the third codeword in the plurality of received signals; and
      applying the post-equalizer to the second equalized signal after subtracting the first interference signal and the second interference signal from the first equalized signal.

10. The method according to claim 8, further comprising:
   performing a first error detection operation on the first codeword after decoding the first codeword; and
   determining whether the first codeword was decoded correctly based on the performed first error detection operation;
   performing a second error detection operation on the second codeword after decoding the second codeword; and
   determining whether the second codeword was decoded correctly based on the performed second error detection operation,
   wherein subtracting the first interference signal and the second interference signal from the second equalized signal comprises:
      subtracting the first interference signal from the second equalized signal only when it is determined that the first codeword was decoded correctly, and
      subtracting the second interference signal from the second equalized signal only when it is determined that the second codeword was decoded correctly.

11. A multiple input, multiple output (MIMO) receiver, comprising:
- a first receiver device including a first decoder, the first receiver device configured to:
  - generate a first MIMO equalizer corresponding to a first codeword in a plurality of received signals,
  - apply the first MIMO equalizer to the plurality of received signals to generate a first equalized signal, and
  - process the first equalized signal to decode the first codeword;
- a second receiver device including a second decoder, the second receiver device configured to:
  - generate a second MIMO equalizer corresponding to a second codeword in the plurality of received signals,
  - apply the second MIMO equalizer to the plurality of received signals to generate a second equalized signal,
  - generate an interference signal using the first codeword,
  - subtract the interference signal from the second equalized signal, and
  - process the second equalized signal to decode the second codeword using the second decoder.

12. A multiple input, multiple output (MIMO) receiver, comprising:
- a first receiver device including a first decoder, the first receiver device configured to process a plurality of received signals to decode a first codeword;
- a second receiver device including a second decoder, the second receiver device configured to:
  - generate an equalizer corresponding to a second codeword in the plurality of received signals, wherein the equalizer is a pre-equalizer,
  - apply the equalizer to the plurality of received signals to generate an equalized signal,
  - generate an interference signal using the first codeword,
  - subtract the interference signal from the equalized signal, and
  - process the equalized signal to decode the second codeword using the second decoder,
  - generate a post-equalizer corresponding to the second codeword in the plurality of received signals, and
  - apply the post-equalizer to the equalized signal after subtracting the interference signal from the equalized signal.

13. The MIMO receiver of claim 11, wherein:
the first receiver device is configured to:
- perform an error detection operation on the first codeword after decoding the first codeword, and
- determine whether the first codeword was decoded correctly based on the performed error detection operation; and the second receiver device is configured to subtract the interference signal from the second equalized signal only when it is determined that the first codeword was decoded correctly.

14. The MIMO receiver of claim 11, wherein the first receiver device is configured to generate the first MIMO equalizer as a minimum mean square error (MMSE) equalizer.

15. The MIMO receiver of claim 11, wherein the second receiver device is configured to generate the second MIMO equalizer as at least one of a matched filter equalizer or a maximal ratio combining (MRC) equalizer.

16. The MIMO receiver of claim 11, wherein the second receiver device is configured to:
- store the second equalized signal in a memory at least until the interference signal has been calculated; and
- retrieve the second equalized signal from the memory for subtracting the interference signal from the second equalized signal.

17. The MIMO receiver of claim 11, wherein the second receiver device is configured to:
- store at least a portion of a cross-correlation matrix in a memory at least until the interference signal has been calculated;
- retrieve the at least the portion of the cross-correlation matrix from the memory; and
- subtract the interference signal from the second equalized signal at least by subtracting a combination of the retrieved at least the portion of the cross-correlation matrix and the interference signal from the second equalized signal.

18. The MIMO receiver of claim 17, wherein:
the second MIMO equalizer is a pre-equalizer; and
the second receiver device is configured to:
- generate a post-equalizer corresponding to the second codeword in the plurality of received signals using the retrieved at least the portion of the cross-correlation matrix, and
- apply the post-equalizer to the second equalized signal after subtracting the interference signal from the second equalized signal.

19. A multiple input, multiple output (MIMO) receiver, comprising:
- a first receiver device including a first decoder, the first receiver device configured to process a plurality of received signals to decode a first codeword;
- a second receiver device including a second decoder, the second receiver device configured to:
  - generate a first equalizer corresponding to a second codeword in the plurality of received signals;
  - apply the first equalizer to the plurality of received signals to generate a first equalized signal,
  - generate a first interference signal using the first codeword,
  - subtract the first interference signal from the first equalized signal, and
  - process the first equalized signal to decode the second codeword using the second decoder,
- a third receiver device including a third decoder, the third receiver device configured to:
  - generate a second equalizer corresponding to a third codeword in the plurality of received signals,
  - apply the second equalizer to the plurality of received signals to generate a second equalized signal,
  - generate a second interference signal using the second codeword,
  - subtract the first interference signal and the second interference signal from the second equalized signal, and
  - process the second equalized signal to decode the third codeword using the third decoder.

20. The MIMO receiver according to claim 19, wherein:
the second equalizer is a pre-equalizer; and
the third receiver device is further configured to:
- generate a post-equalizer corresponding to the third codeword in the plurality of received signals, and
- apply the post-equalizer to the second equalized signal after subtracting the first interference signal and the second interference signal from the first equalized signal.

21. The MIMO receiver according to claim 19, wherein:
the first receiver device is further configured to
- perform a first error detection operation on the first codeword after decoding the first codeword, and
- determine whether the first codeword was decoded correctly based on the performed first error detection operation;

the second receiver device is further configured to
- perform a second error detection operation on the second codeword after decoding the second codeword, and
- determine whether the second codeword was decoded correctly based on the performed second error detection operation; and the third receiver device is further configured to
- subtract the first interference signal from the second equalized signal only when it is determined that the first codeword was decoded correctly, and
- subtract the second interference signal from the second equalized signal only when it is determined that the second codeword was decoded correctly.

* * * * *